(12) United States Patent
Li et al.

(10) Patent No.: US 12,125,458 B2
(45) Date of Patent: Oct. 22, 2024

(54) DISPLAY TERMINAL ADJUSTMENT METHOD AND DISPLAY TERMINAL

(71) Applicant: TCL TECHNOLOGY GROUP CORPORATION, Guangdong (CN)

(72) Inventors: Yang Li, Guangdong (CN); Hongwei Li, Guangdong (CN)

(73) Assignee: TCL TECHNOLOGY GROUP CORPORATION, Huizhou (CN)

( * ) Notice: Subject to any disclaimer, the term of this patent is extended or adjusted under 35 U.S.C. 154(b) by 88 days.

(21) Appl. No.: 17/853,941

(22) Filed: Jun. 30, 2022

(65) Prior Publication Data

US 2022/0328019 A1 Oct. 13, 2022

Related U.S. Application Data

(63) Continuation-in-part of application No. PCT/CN2020/128797, filed on Nov. 13, 2020.

(30) Foreign Application Priority Data

Dec. 31, 2019 (CN) .......................... 201911407809.5

(51) Int. Cl.
G09G 5/00 (2006.01)
(52) U.S. Cl.
CPC ............. *G09G 5/005* (2013.01); *G09G 5/006* (2013.01); *G09G 2340/0407* (2013.01); *G09G 2340/0442* (2013.01)
(58) Field of Classification Search
None
See application file for complete search history.

(56) References Cited

U.S. PATENT DOCUMENTS

| 11,144,099 B1* | 10/2021 | Silber | G06F 3/04845 |
| 2008/0291221 A1* | 11/2008 | Yamada | G06F 3/14 345/660 |
| 2012/0038625 A1 | 2/2012 | Kim | |
| 2014/0184727 A1 | 7/2014 | Xiao et al. | |

(Continued)

FOREIGN PATENT DOCUMENTS

| CN | 102981793 A | 3/2013 |
| CN | 103823620 A | 5/2014 |

(Continued)

OTHER PUBLICATIONS

International Search Report of PCT Patent Application No. PCT/CN2020/128797 issued on Feb. 7, 2021.

*Primary Examiner* — Yingchun He (57) ABSTRACT

A display terminal adjustment method is provided, this method includes: obtaining image data of an image to be displayed and screen data of the display terminal; obtaining a first adjustment ratio and a second adjustment ratio according to an image size in the image data and a screen size in the screen data; adjusting the image to be displayed to obtain a first target image according to the first adjustment ratio, and adjusting the image to be displayed to obtain a second target image according to the second adjustment ratio; and adjusting the display terminal to be in a target display mode according to the first target image and the second target image, according to this method, a size of a blank area of the display terminal is reduced, and an utilization rate of the screen of the display terminal is improved.

11 Claims, 3 Drawing Sheets

(56) References Cited

U.S. PATENT DOCUMENTS

2014/0348485 A1* 11/2014 Fujiwara .......... H04N 21/43635
386/231
2021/0405950 A1* 12/2021 Li ........................ G06F 3/1454

FOREIGN PATENT DOCUMENTS

| CN | 104679466 A | 6/2015 |
|----|-------------|--------|
| CN | 105068779 A | 11/2015 |
| CN | 108279953 A | 7/2018 |
| CN | 108446085 A | 8/2018 |
| CN | 109656503 A | 4/2019 |
| CN | 109828735 A | 5/2019 |

\* cited by examiner

DISPLAY TERMINAL ADJUSTMENT METHOD AND DISPLAY TERMINAL

CROSS-REFERENCE TO RELATED APPLICATIONS

This application is a continuation-in-part of PCT patent application Serial No. PCT/CN2020/128797, filed on Nov. 13, 2020, which claims priority to Chinese patent application No. 201911407809.5 filed on Dec. 31, 2019 and entitled "display terminal adjustment method and display terminal", the contents of which are incorporated herein by reference in entirety.

TECHNICAL FIELD

The present application relates to the technical field of display terminals, and more particularly to a display terminal adjustment method and a display terminal.

DESCRIPTION OF RELATED ART

With the development of smart phones, using a smart phone to watch contents of photos or videos are becoming more and more popular. Since a screen size of the smart phone is small, in order to obtain a better viewing effect, many people may project contents such as photos or videos on a display terminal such as television and watch the contents on the display terminal; however, the existing display terminals such as television are generally displayed in a landscape display mode, and are suitable for displaying contents such as a picture or a video in the landscape display mode. Moreover, when displaying contents such as a picture or a video in a portrait mode, existence of lots of blank areas in a screen of a display terminal such as a television are often caused, thus, not only a utilization rate of the screen of the display terminal is reduced, but also a viewing experience of a user is greatly reduced.

SUMMARY

A display terminal adjustment method and a display terminal are provided in the embodiments of the present application, this display terminal adjustment method and this display terminal can solve the problem that there is a larger blank area in the screen, and thus the utilization rate of the screen of the display terminal is reduced when contents are displayed on the display terminal.

In the first aspect, a display terminal adjustment method implemented on the display terminal is provided in one embodiment of the present application, this method includes:
obtaining image data corresponding to an image to be displayed and screen data corresponding to the display terminal, where the image data includes an image size, and the screen data includes a screen size;
obtaining a first adjustment ratio and a second adjustment ratio according to the image size and the screen size, wherein the first adjustment ratio is an adjustment ratio corresponding to the display terminal in a first display mode, and the second adjustment ratio is an adjustment ratio corresponding to the display terminal in a second display mode;
adjusting the image to be displayed to obtain a first target image according to the first adjustment ratio, and adjusting the image to be displayed to obtain a second target image according to the second adjustment ratio; and
adjusting the display terminal to be displayed to be in a target display mode according to the first target image and the second target image, where the target display mode is the first display mode or the second display mode.

Furthermore, said adjusting the display terminal as the target display mode according to the first target image and the second target image may include:
obtaining a first image area corresponding to the first target image and a second image area corresponding to the second target image;
determining whether the second image area is greater than the first image area; and
adjusting the display terminal to be in the second display mode if the second image area is determined as being greater than the first image area; or adjusting the display terminal to be in the first display mode if the second image area is determined as being smaller than or equal to the first image area.

Furthermore, said obtaining the image data of the image to be displayed and the screen data of the display terminal may include:
obtaining a display interface of the display terminal, and determining the image data of the image to be displayed and the screen data corresponding to the display terminal according to the display interface.

Furthermore, said determining the image data of the image to be displayed and the screen data of the display terminal according to the display interface includes:
determining the screen data of the display terminal according to interface data of the display interface;
obtaining a blank area in the display interface, and determining area data of the blank area; and
determining the image data of the image to be displayed according to the screen data and the area data.

Furthermore, said obtaining the blank area in the display interface includes:
obtaining ARGB values of a plurality of pixels in an image corresponding to the display interface; and
determining target pixels which have an ARGB value being equal to a preset value, and determining an area composed of the target pixels as the blank area.

Furthermore, the image size includes an original image height and an original image width, and the screen size includes an original screen height and an original screen width;
said obtaining the first adjustment ratio and the second adjustment ratio according to the image size and the screen size includes:
determining a first candidate ratio according to the original screen height and the original image height, and determining a second candidate ratio according to the original screen width and the original image width;
determining the first candidate ratio as the first adjustment ratio if the first candidate ratio is less than or equal to the second candidate ratio; or determining the second candidate ratio as the first adjustment ratio if the first candidate ratio is greater than the second candidate ratio; and
determining a third candidate ratio according to the original screen width and the original image height, and determining a fourth candidate ratio according to the original screen height and the original image width;

determining the third candidate ratio as the second adjustment ratio if the third candidate ratio is less than or equal to the fourth candidate ratio; or determining the fourth candidate ratio as the second adjustment ratio if the third candidate ratio is greater than the fourth candidate ratio.

Furthermore, after said adjusting the display terminal as the target display mode according to the first target image and the second target image, the method further includes:

obtaining an original angle and an original direction corresponding to the image to be displayed and a target angle and a target direction corresponding to the target display mode;

determining a target adjustment angle of the image to be displayed according to the original angle and the target angle, and determining a target adjustment direction of the image to be displayed according to the original direction and the target direction;

determining a target adjustment ratio of the image to be displayed according to the target display mode, wherein the target adjustment ratio is the first adjustment ratio or the second adjustment ratio; and adjusting the image to be displayed according to the target adjustment ratio, the target adjustment angle and the target adjustment direction, and displaying the image to be displayed adjusted according to the target adjustment ratio, the target adjustment angle and the target adjustment direction on the display terminal.

In the second aspect, a display terminal is provided in one embodiment of the present application, this display terminal includes a memory, a processor and a computer program stored in the memory and executed by the processor, when the computer program is executed by the processor, the processor is caused to implement the following steps of:

obtaining image data corresponding to an image to be displayed and screen data corresponding to the display terminal, where the image data includes an image size, and the screen data includes a screen size;

obtaining a first adjustment ratio and a second adjustment ratio according to the image size and the screen size, wherein the first adjustment ratio is an adjustment ratio corresponding to the display terminal in a first display mode, and the second adjustment ratio is an adjustment ratio corresponding to the display terminal in a second display mode;

adjusting the image to be displayed to obtain a first target image according to the first adjustment ratio, and adjusting the image to be displayed to obtain a second target image according to the second adjustment ratio; and adjusting the display terminal to be displayed to be in a target display mode according to the first target image and the second target image, where the target display mode is the first display mode or the second display mode.

In the third aspect, a non-transitory computer readable storage medium is provided in one embodiment of the present application, the computer readable storage medium stores a computer program, that, when executed by a processor, causes the processor to implement the display terminal adjustment method, including:

obtaining image data corresponding to an image to be displayed and screen data corresponding to the display terminal, where the image data includes an image size, and the screen data includes a screen size;

obtaining a first adjustment ratio and a second adjustment ratio according to the image size and the screen size, wherein the first adjustment ratio is an adjustment ratio corresponding to the display terminal in a first display mode, and the second adjustment ratio is an adjustment ratio corresponding to the display terminal in a second display mode;

adjusting the image to be displayed to obtain a first target image according to the first adjustment ratio, and adjusting the image to be displayed to obtain a second target image according to the second adjustment ratio; and adjusting the display terminal to be displayed to be in a target display mode according to the first target image and the second target image, where the target display mode is the first display mode or the second display mode.

In the fourth aspect, a computer program product is provided in one embodiment of the present application, when the computer program product is executed on the display terminal, the display terminal is caused to perform the display terminal adjustment method, including:

obtaining image data corresponding to an image to be displayed and screen data corresponding to the display terminal, where the image data includes an image size, and the screen data includes a screen size;

obtaining a first adjustment ratio and a second adjustment ratio according to the image size and the screen size, wherein the first adjustment ratio is an adjustment ratio corresponding to the display terminal in a first display mode, and the second adjustment ratio is an adjustment ratio corresponding to the display terminal in a second display mode;

adjusting the image to be displayed to obtain a first target image according to the first adjustment ratio, and adjusting the image to be displayed to obtain a second target image according to the second adjustment ratio; and adjusting the display terminal to be displayed to be in a target display mode according to the first target image and the second target image, where the target display mode is the first display mode or the second display mode.

As compared to the prior art, the beneficial effects of the embodiments of the present application are listed below:

In the embodiments of the present application, first, the image data of the image to be displayed and the screen data corresponding to the display terminal are obtained, where the image data includes an image size, and the screen data includes a screen size; then, the first adjustment ratio and the second adjustment ratio are obtained according to the image size and the screen size, where the first adjustment ratio is an adjustment ratio corresponding to the display terminal when the display terminal is in the first display mode, and the second adjustment ratio is an adjustment ratio corresponding to the display terminal when the display terminal is in the second display mode, and the image to be displayed is adjusted to obtain a first target image according to the first adjustment ratio, and the image to be displayed is adjusted to obtain a second target image according to the second adjustment ratio; finally, the display terminal is adjusted to be displayed in the target display mode according to the first target image and the second target image, where the target display mode is the first display mode or the second display mode, so that the target display mode of the display terminal is determined according to the image size and the screen size, the blank area of the display terminal is reduced when the image to be displayed is displayed on the display terminal, the utilization rate of the screen of the display terminal is improved, and a viewing experience of a user is improved.

BRIEF DESCRIPTION OF THE DRAWINGS

In order to describe the technical solutions in the embodiments of the present application more clearly, a brief introduction regarding the accompanying drawings that need to be used in the embodiments or the prior art is given below; it is obvious that the accompanying figures described below are merely some embodiments of the present application, for the person of ordinary skill in the art, other drawings can also be obtained according to the current drawings without paying creative labor.

DETAILED DESCRIPTION

In the following descriptions, in order to describe but not intended to limit the present application, concrete details including specific system structure and technique are proposed, so that a comprehensive understanding of the embodiments of the present application is facilitated. However, a person of ordinarily skill in the art should understand that, the present application can also be implemented in some other embodiments from which these concrete details are excluded. In other conditions, detailed explanations of method, circuit, device and system well known to the public are omitted, so that unnecessary details which are not good for understanding of the description of the present application may be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Additionally, in the descriptions of the specification and the annexed claims, terms such as "first" and "second", "third", etc., are only intended to be discriminated in description, and shouldn't be interpreted as indicating or implying a relative importance.

The descriptions of "referring to one embodiment" and "referring to some embodiments", and the like as described in the specification of the present application means that a specific feature, structure, or characters which are described with reference to this embodiment are included in one or more embodiments of the present application. Thus, sentences such as "in one embodiment", "in some embodiments", "in some other embodiments", "in other embodiments" in this specification are not necessarily referring to the same embodiment, but instead indicate "one or more embodiments instead of all embodiments", unless there is a special emphasis in other manner otherwise. The terms "comprising", "including", "having" and their variations mean "including but is not limited to", unless there is a special emphasis in other manner otherwise.

Figure 1:
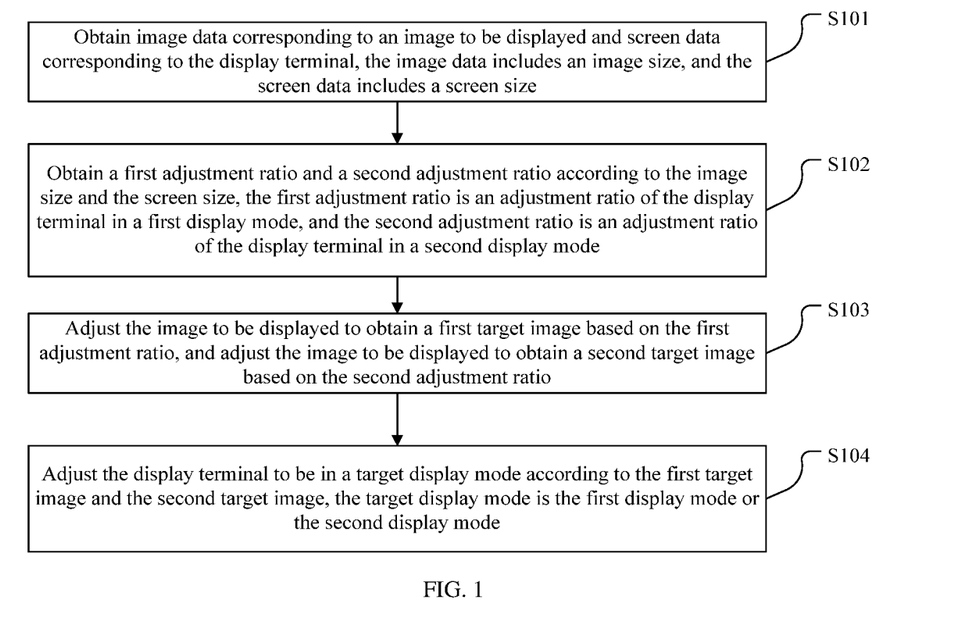
FIG. 1 illustrates a schematic flowchart of a method for adjusting a display terminal according to one embodiment of the present application.

As shown in FIG. 1, a display terminal adjustment method is provided in one embodiment of the present application. The executive subject of the embodiment of the present application may be a display terminal 6 such as a television or be a terminal device connected with the display terminal (e.g., the television), and the terminal device includes but is not limited to a desktop computer, a notebook, a palmtop computer, and a cloud server. The present application will be described by taking the executive subject of the display terminal adjustment method as the display terminal 6 (e.g., the television) as an example. The display terminal adjustment method may include:

At step S101, image data corresponding to an image to be displayed and screen data corresponding to the display terminal 6 are obtained, where the image data includes an image size, and the screen data includes a screen size.

It may be understood that the image to be displayed may be the content such as an image, a picture or a video projected on the display terminal 6 through a mobile terminal (e.g., a mobile phone and a tablet computer). The image data of the image to be displayed may include an image type and an image size (e.g., image width and image height) of the image to be displayed; the screen data corresponding to the display terminal 6 may include a screen size (e.g., a screen width and a screen height) of the display terminal 6. Where, the image width is the number of pixels in the horizontal direction, the image height is the number of pixels in the longitudinal direction, the screen width is the number of pixels of the screen in the horizontal direction, and the screen height is the number of pixels of the screen in the longitudinal direction.

At step S102, a first adjustment ratio and a second adjustment ratio are obtained according to the image size and the screen size, the first adjustment ratio is an adjustment ratio corresponding to the display terminal 6 when the display terminal 6 is in the first display mode, and the second adjustment ratio is an adjustment ratio corresponding to the display terminal 6 when the display terminal 6 is in the second display mode;

It should be understood that the first display mode may be a landscape display mode, and the second display mode may be a portrait display mode, that is, the first adjustment ratio is an adjustment ratio for displaying the image to be displayed on the display terminal 6 in the landscape display mode, and the second adjustment ratio is an adjustment ratio for displaying the image to be displayed on the display terminal 6 in the portrait display mode.

Here, the image size includes an original image height and an original image width, the screen size includes an original screen height and an original screen width. The original image height refers to the image height of the image without adjustment, and the original image width refers to the image width of the image without adjustment.

Figure 2:
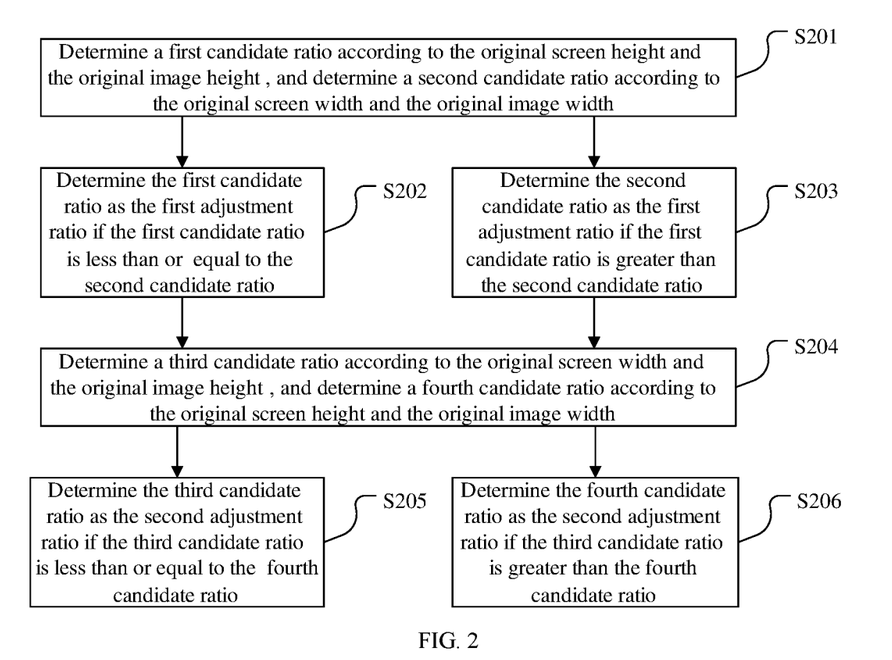
FIG. 2 illustrates a schematic flowchart of determining an adjustment ratio in the method for adjusting the display terminal in an application scenario according to one embodiment of the present application.

In particular, as shown in FIG. 2, said obtaining the first adjustment ratio and the second adjustment ratio according to the image size and the screen size may include:

At step S201, a first candidate ratio according to the original screen height and the original image height, and a second candidate ratio is determined according to the original screen width and the original image width;

It should be noted that the first candidate ratio may be the original screen height/the original image height, that is, the first candidate ratio is the ratio of the display terminal 6, where the original screen height of the display terminal 6 is preferentially filled by adjusting the original image height of the image to be displayed. The second candidate ratio may be the original screen width/the original image width, that is, the second candidate ratio is the ratio of the display terminal 6, where the original screen width of the display terminal 6 is preferentially filled by adjusting the original image width of the image to be displayed.

For example, when the original image width of the image to be displayed is 2400 pixels, the original image height of the image to be displayed is 900 pixels, the original screen width of the display terminal 6 is 1600 pixels, and the original screen height of the display terminal 6 is 1200 pixels, the first candidate ratio may be 1200/900=1.33, and the second candidate ratio may be 1600/2400=0.67.

At step S202, the first candidate ratio is determined as the first adjustment ratio if the first candidate ratio is less than or equal to the second candidate ratio.

At step S203, the second candidate ratio is determined as the first adjustment ratio if the first candidate ratio is greater than the second candidate ratio.

Here, the display terminal 6 may determine the first adjustment ratio according to the first candidate ratio and the second candidate ratio. In particular in order to ensure that the adjusted image to be displayed may be completely displayed on the display terminal 6, the display terminal 6 may determine one of the first candidate ratio and the second candidate ratio which has a smaller ratio value as the first adjustment ratio. For example, the first candidate ratio with the ratio of 0.67 may be determined as the first adjustment ratio.

At step S204, a third candidate ratio is determined according to the original screen width and the original image height, and a fourth candidate ratio is determined according to the original screen height and the original image width.

It should be noted that the third candidate ratio may be the original screen width/the original image height, that is, the third candidate ratio is the ratio of the display terminal 6, where the original screen width of the display terminal 6 is preferentially filled by adjusting the original image height of the image to be displayed. The fourth candidate ratio may be the original screen height/the original image width, that is, the fourth candidate ratio is the ratio of the display terminal 6, where the original screen height of the display terminal 6 is preferentially filled by adjusting the original image width of the image to be displayed.

For example, when the original image width of the image to be displayed is 2400 pixels, the original image height of the image to be displayed is 900 pixels, the original screen width of the display terminal 6 is 1600 pixels, and the original screen height of the display terminal 6 is 1200 pixels, the third candidate ratio may be 1600/900=1.78, and the fourth candidate ratio may be 1200/2400=0.5.

At step S205, the third candidate ratio is determined as the second adjustment ratio if the third candidate ratio is less than or equal to the fourth candidate ratio.

At step S206, the fourth candidate ratio is determined as the second adjustment ratio if the third candidate ratio is greater than the fourth candidate ratio.

Here, in order to ensure that the adjusted image to be displayed may be completely displayed on the display terminal 6, the display terminal 6 may determine one of the third candidate ratio and the fourth candidate ratio which has a smaller ratio value as the second adjustment ratio. For example, the fourth candidate ratio with a ratio value of 0.5 may be determined as the second adjustment ratio.

At step S103, the image to be displayed is adjusted to obtain a first target image according to the first adjustment ratio, and the image to be displayed is adjusted to obtain a second target image according to the second adjustment ratio;

It should be understood that after the first adjustment ratio and the second adjustment ratio are obtained by the display terminal 6, the image to be displayed may be adjusted to obtain the first target image according to the first adjustment ratio, and the image to be displayed may be adjusted to obtain the second target image according to the second adjustment ratio.

For example, the display terminal 6 may create the first target image corresponding to the first adjustment ratio by invoking a Setratio (r, r) method of a Matrix Transform Matrix object and a createBitmap method of a Bitmap object, the display terminal 6 may also create the second target image corresponding to the second adjustment ratio by invoking the Setratio (r, r) method of the Matrix Transform Matrix object and the createBitmap method of the Bitmap object.

At step S104, the display terminal 6 is adjusted to be in a target display mode according to the first target image and the second target image, where the target display mode is the first display mode or the second display mode.

In particular, the display terminal 6 may first obtain a first image area corresponding to the first target image and a second image area corresponding to the second target image; and then determine whether the second image area is greater than the first image area; if the second image area is greater than the first image area, the target display mode may be determined as the second display mode, that is, the display terminal 6 may be adjusted to be in the second display mode; if the second image area is less than or equal to the first image area, the target display mode may be determined as the first display mode, that is, the display terminal 6 may be adjusted to be in the first display mode.

It should be understood that the first image area corresponding to the first target image may be a product of a first target image height of the first target image and a first target image width of the first target image, the first target image height may be a number of pixels of the first target image in the longitudinal direction, and the first target image width may be the number of pixels of the first target image in the horizontal direction. Similarly, the second image area corresponding to the second target image may be a product of a second target image height of the second target image and a second target image width of the second target image, the second target image height may be the number of pixels of the second target image in the longitudinal direction, and the second target image width may be the number of pixels of the second target image in the horizontal direction.

In one preferable embodiment, when the display terminal 6 cannot obtain the image size of the image to be displayed and/or the screen size of the display terminal 6 directly, the display terminal 6 may obtain a display interface of the display terminal 6 in real time, where the display interface refers to an interface on which the image to be displayed is being displayed, the image data of the image to be displayed and the screen data corresponding to the display terminal 6 may be determined according to the display interface.

In particular, the display terminal 6 may determine the screen data corresponding to the display terminal 6 according to interface data of the display interface; furthermore, blank area in the display interface may be obtained, and area data of the blank area may be determined; then, the image data of the image to be displayed may be determined according to the screen data and the area data.

For example, when an image to be displayed (e.g., an image, a picture, or a video) are displayed in the display terminal 6, the display terminal 6 may capture a screen thereof in a full-screen manner when the display terminal 6 is displaying the image, that is, the full screen of the display terminal 6 may be captured, and a screenshot image is obtained, that is, the screenshot image is the image corresponding to the full screen of the display terminal 6. That is, the image data corresponding to the screenshot image is the interface data of the display interface, and the interface data is the screen data corresponding to the display terminal 6, thus, the image size corresponding to the screenshot image may be the screen size corresponding to the display terminal 6.

Here, after the screenshot image is obtained, the display terminal 6 may perform image analysis on the screenshot image through a target detection technology or an analysis technology of ARGB (Alpha, Red, Green, Blue) values of pixels, thereby obtaining the blank area included in the screenshot image and the content area corresponding to the image to be displayed. Where the blank area refers to a part of the area of the display interface of the display terminal 6 which does not need to display the image to be displayed due to fact that an aspect ratio of the screen of the display terminal 6 is inconsistent with an aspect ratio of the image to be displayed (e.g., image, picture, animation, movie, etc.). The content area refers to an area where the image to be displayed is displayed in the display interface.

For example, the display terminal 6 may detect a content area corresponding to the image to be displayed through a target detection technology, and may determine a area which is beyond the content area and corresponds to the image to be displayed in the screenshot image as the blank area.

In one preferable embodiment, the display terminal 6 may also perform image analysis on the screenshot image to directly obtain the blank area included in the screenshot image. In particular, the display terminal 6 may obtain the ARGB values of the plurality of pixels in the screenshot image first; then, target pixels with the ARGB values equal to the preset value may be determined, and a area composed of the target pixels may be determined as the blank area.

It should be understood that, since the blank area is an area that does not display content in the display interface, so that the color of the blank area is generally as same as the original color of the screen, where the original color may be white or black, that is, all pixels in the blank area have the same ARGB value. Where the ARGB values of the pixels in the blank area (i.e., the aforesaid preset value) may be determined according to a specific situation; for example, in a scenario where the original color of the screen is white, the preset value may be determined as (255, 255, 255).

Figure 3:
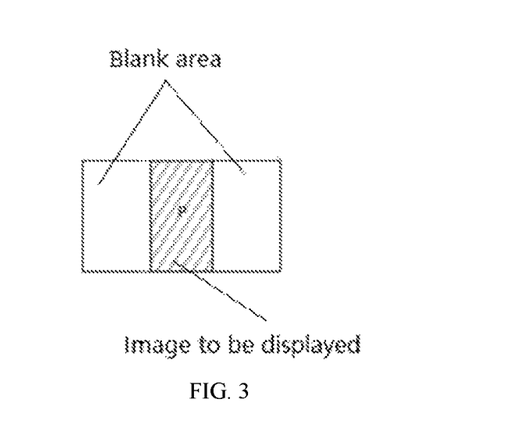
FIG. 3 illustrates a schematic block diagram of an obtained blank area according to one embodiment of the present application.

Here, after the screenshot image is obtained by the display terminal 6, the display terminal 6 may obtain the ARGB values of the plurality of pixels in the screenshot image first; for example, the ARGB value of each pixel may be obtained first by invoking an Android standard interface getPixel, then, the target pixels with the ARGB value being equal to the preset value may be determined, and the area composed of the target pixels may be obtained as the blank area. This area may be a rectangular area, that is, the ARGB value of all pixels in the rectangular area is the preset value. There may be one or more than one rectangular areas, that is, the blank area may include one or more than one rectangular areas; for example, in a specific application, the display terminal 6 may obtain a blank area including two rectangular areas at two sides as shown in FIG. 3, and an intermediate area is a content area corresponding to the image P to be displayed.

In one preferable embodiment, in order to ensure the accuracy of acquisition of the blank area, after the screenshot image is obtained by the display terminal 6, the display terminal 6 may first establish a coordinate system by taking a top left vertex of the screenshot image as an origin, taking a horizontal boundary connected with the top left vertex as a horizontal axis positive direction, and taking a longitudinal boundary connected with the top left vertex as a longitudinal axis positive direction, and then obtain the ARGB values of the pixels by invoking the Android standard interface getPixel, and determine the target pixels with the ARGB value being equal to the preset value; then, the display terminal 6 can obtain the rectangular area composed of the target pixels and determine whether a left boundary coordinate of the rectangular area is 0 or determine whether a coordinate of the right boundary of the rectangular area is the same as a coordinate of another longitudinal boundary being not connected with the origin in the screenshot image; the rectangular area is determined as the blank area if the coordinate of the left boundary of the rectangular area is 0 or if the coordinate of the right boundary of the rectangular area is the same as the coordinate of the longitudinal boundary being not connected with the origin in the screenshot image.

It should be noted that, in this embodiment of the present application, the coordinate system is established by taking the top left vertex of the screenshot image as the origin of coordinate as illustrative explanation, this coordinate system should not be construed as a limitation to the embodiments of the present application. In this embodiment of the present application, of course, the coordinate system can also be established by taking a bottom left vertex, or a top right vertex, or a bottom right vertex of the screenshot image as the origin of coordinate, and the blank area may be determined according to the established coordinate system. The method for determining the blank area by establishing the coordinate system which takes the bottom left vertex, the top right vertex or the bottom right vertex as the origin of coordinate is the same as the method for determining the blank area by establishing the coordinate system which takes the top left vertex as the origin of coordinate, the two methods have the similar basic principle, so that the details of the method for determining the blank area are not repeatedly described herein.

It should be understood that when there is no blank area in the screenshot image, it means that the image to be displayed is displayed on the display interface of the display terminal 6 in the full-screen manner, that is, an utilization rate of the screen of the display terminal 6 has been maximized, in this situation, the display terminal 6 may no longer perform subsequent operations, instead, the image to be displayed is directly displayed on the display terminal 6 in the current presentation manner.

Here, when existence of blank area is determined, the display terminal 6 may determine the image data of the image to be displayed according to the screen data (including the screen size) of the display interface and the area data (including the image size corresponding to the blank area) of the blank area, that is, the image size corresponding to the image to be displayed may be determined according to the screen size of the display interface and the image size of the blank area, the first adjustment ratio and the second adjustment ratio may be obtained according to the screen size of the display interface and the image size of the image to be displayed, so that the image height and the image width corresponding to the content area are adjusted according to the first adjustment ratio or the second adjustment ratio.

In one preferable embodiment, when the first image area corresponding to the first target image obtained by adjusting according to the first adjustment ratio is greater than or equal to the second image area corresponding to the second target image obtained by adjusting according to the second adjustment ratio, the display terminal 6 may determine that the image to be displayed is displayed in a first display mode (i.e., the landscape display mode), such that a displayed blank area of the display terminal 6 can be reduced. In this condition, the display terminal 6 may obtain a current angle and a current direction of the display terminal 6, where the current angle and the current direction are the angle and direction of the display terminal 6 relative to the horizontal direction, and the display terminal 6 may be rotated and adjusted according to the current angle, the current direction, and the target angle and the target direction corresponding to the landscape display mode, so that the display terminal 6 is adjusted to be in the landscape display mode.

When the first image area corresponding to the first target image obtained by adjusting according to the first adjustment ratio is smaller than the second image area corresponding to the second target image obtained by adjusting according to the second adjustment ratio, the display terminal 6 may determine that the image to be displayed is displayed in the second display mode (i.e., the portrait display mode), so that the displayed blank area of the display terminal 6 may be reduced. In this condition, the display terminal 6 may obtain the current angle and the current direction of the display terminal 6, where the current angle and the current direction are the angle and the direction of the display terminal 6 relative to the horizontal direction, and the display terminal 6 may be rotated and adjusted according to the current angle, the current direction, and the target angle and the target direction corresponding to the portrait display mode, so that the display terminal 6 is adjusted to be in the portrait display mode.

Figure 4:
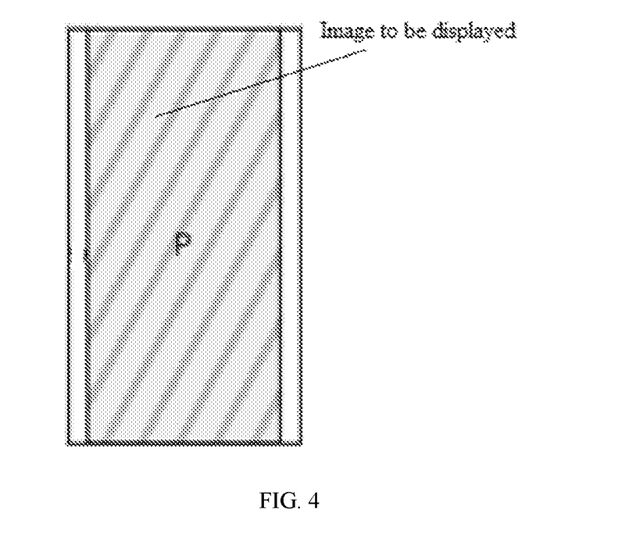
FIG. 4 illustrates a display effect of the image to be displayed according to one embodiment of the present application.

It may be understood that, in order to ensure the viewing effect of the image to be displayed, in the adjusting and rotating process of the display terminal 6, the display terminal 6 may synchronously adjust and rotate the image to be displayed. In particular, the display terminal 6 may be configured to: first obtain the original angle and the original direction corresponding to the image to be displayed, and the target angle and the target direction corresponding to the target display mode; determine a target adjustment angle corresponding to the image to be displayed according to the original angle and the target angle; and determine a target adjustment direction corresponding to the image to be displayed according to the original direction and the target direction; and determine a target adjustment ratio corresponding to the image to be displayed according to the target display mode, where the target adjustment ratio is the first adjustment ratio or the second adjustment ratio; and finally adjust the image to be displayed according to the target adjustment ratio, the target adjustment angle and the target adjustment direction, and display the adjusted image to be displayed on the display terminal 6. For example, in a specific application scenario, a presentation of image effect of the image to be displayed as shown in FIG. 4 may be obtained.

In this embodiment of the present application, the image data of the image to be displayed and the screen data corresponding to the display terminal 6 are obtained, where the image data includes the image size, and the screen data includes the screen size; the first adjustment ratio and the second adjustment ratio are obtained according to the image size and the screen size, where the first adjustment ratio is the adjustment ratio of the display terminal 6 when the display terminal 6 is in the first display mode, the second adjustment ratio is the adjustment ratio of the display terminal 6 when the display terminal 6 is in the second display mode, and the image to be displayed is adjusted to obtain the first target image according to the first adjustment ratio, and the image to be displayed is adjusted to obtain the second target image according to the second adjustment ratio; finally, the display terminal 6 is adjusted to be in the target display mode according to the first target image and the second target image, where the target display mode is the first display mode or the second display mode, the target display mode of the display terminal 6 is determined according to the image size and the screen size, so that the blank area of the display terminal 6 is reduced when the image to be displayed is displayed on the display terminal 6, the utilization rate of the screen of the display terminal 6 is improved, and the viewing experience of the user is improved accordingly.

It should be understood that, the values of serial numbers of the steps in the aforesaid embodiments do not indicate an order of execution sequences of the steps; instead, the execution sequences of the steps should be determined by functionalities and internal logic of the steps, and thus shouldn't be regarded as limitation to an implementation process of the embodiment of the present application.

Figure 5:
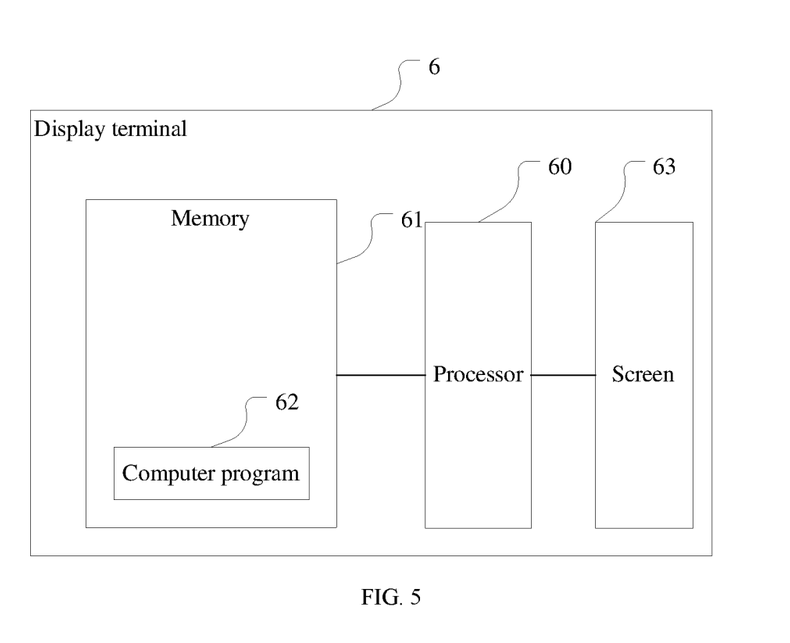
FIG. 5 illustrates a schematic structural diagram of the display terminal according to one embodiment of the present application.

FIG. 5 illustrates a schematic structural diagram of a display terminal 6 provided by one embodiment of the present application. As shown in FIG. 5, the display terminal 6 in this embodiment includes: at least one processor 60 (only one processor is shown in FIG. 5), a memory 61, a computer program 62 stored in the memory 61 and executable by the at least one processor 60, and a screen 63, when the computer program 62 is executed by the processor 60, the processor 60 is caused to:

obtain image data of an image to be displayed and screen data of the display terminal 6, where the image data includes an image size, and the screen data comprises a screen size;

obtain a first adjustment ratio and a second adjustment ratio according to the image size and the screen size, where the first adjustment ratio is an adjustment ratio corresponding to the display terminal in a first display mode, and the second adjustment ratio is an adjustment ratio corresponding to the display terminal 6 in a second display mode;

adjust the image to be displayed according to the first adjustment ratio to obtain a first target image, and adjust the image to be displayed to obtain a second target image according to the second adjustment ratio; and adjust the display terminal 6 to be in a target display mode according to the first target image and the second target image, wherein the target display mode is the first display mode or the second display mode.

In one embodiment, when the computer program 62 is executed by the processor 60, the processor 60 is further caused to:

obtain a first image area corresponding to the first target image and a second image area corresponding to the second target image;

determine whether the second image area is greater than the first image area; and adjust the display terminal 6 to be in the second display mode if the second image area is determined as being greater than the first image area; or adjust the display terminal 6 to be in the first display mode if the second image area is determined as being smaller than or equal to the first image area.

In one embodiment, when the computer program is executed by the processor, the processor is further caused to:

obtain a display interface of the display terminal 6, and determine the image data of the image to be displayed and the screen data of the display terminal 6 according to the display interface.

In one embodiment, when the computer program 62 is executed by the processor 60, the processor 60 is further caused to:

determine the screen data of the display terminal 6 according to interface data of the display interface;

obtain a blank area in the display interface, and determining area data of the blank area; and determine the image data of the image to be displayed according to the screen data and the area data.

In one embodiment, when the computer program 62 is executed by the processor 60, the processor 60 is further caused to:

obtain ARGB values of a plurality of pixels in an image of the display interface; and determine target pixels which have an ARGB value being equal to a preset value from the plurality of pixels in the image of the display interface, and determine an area composed of the target pixels as the blank area.

In one embodiment, the image size comprises an original image height and an original image width, and the screen size comprises an original screen height and an original screen width; when the computer program 62 is executed by the processor 60, the processor 60 is further caused to:

determine a first candidate ratio according to the original screen height and the original image height, and determine a second candidate ratio according to the original screen width and the original image width;

determine the first candidate ratio as the first candidate ratio if the first candidate ratio is less than or equal to the second candidate ratio; or determine the second candidate ratio as the first candidate ratio if the first candidate ratio is greater than the second candidate ratio;

determine a third candidate ratio according to the original screen width and the original image height, and determine a fourth candidate ratio according to the original screen height and the original image width;

determine the third candidate ratio as the second candidate ratio if the third candidate ratio is less than or equal to the fourth candidate ratio; or determine the fourth candidate ratio as the second candidate ratio if the third candidate ratio is greater than the fourth candidate ratio.

In one embodiment, when the computer program 62 is executed by the processor 60, the processor 60 is further caused to:

obtain an original angle and an original direction corresponding to the image to be displayed and a target angle and a target direction corresponding to the target display mode;

determine a target adjustment angle of the image to be displayed according to the original angle and the target angle, and determine a target adjustment direction of the image to be displayed according to the original direction and the target direction;

determine a target adjustment ratio of the image to be displayed according to the target display mode, wherein the target adjustment ratio is the first adjustment ratio or the second adjustment ratio; and adjust the image to be displayed according to the target adjustment ratio, the target adjustment angle and the target adjustment direction, and display the image to be displayed adjusted according to the target adjustment ratio, the target adjustment angle and the target adjustment direction on the display terminal 6.

The display terminal 6 may be a computing device such as a desktop computer, a laptop computer, a palm computer, a cloud server, etc. The display terminal 6 can include but is not limited to: a processor 60, the memory 61. A person of ordinary skill in the art can understand that, FIG. 5 is only one example of the display terminal 6, but should not be constituted as limitation to the display terminal 6, more or less components than the components shown in FIG. 5 may be included; as an alternative, some components or different components may be combined; for example, the display terminal 6 may also include an input and output device, a network access device, etc.

The processor 60 may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor may also be any conventional processor, and the like.

The memory 61 may be an internal storage unit of the display terminal 6, such as a hard disk or a memory of the display terminal 6. The memory 61 may also be an external storage device of the display terminal 6, such as a plug-in hard disk, a SMC (Smart Media Card), a SD (Secure Digital) card, a FC (Flash Card) equipped on the display terminal 6. Furthermore, the memory 61 may not only include the internal storage unit of the display terminal 6, but also include the external memory of the display terminal 6. The memory 61 is configured to store the computer program, and other procedures and data needed by the display terminal 6. The memory 61 may also be configured to store data that has been output or being ready to be output temporarily.

A computer readable storage medium is further provided in one embodiment of the present application, the computer readable storage medium stores a computer program, that, when executed by a processor, causes the processor to implement the steps in the various method embodiments.

A computer program product is provided by one embodiment of the present application, when the computer program is executed on the display terminal 6, the display terminal 6 is caused to implement the steps in the various method embodiments.

When the computer program is executed by the processor, the steps in the various method embodiments described above may be implemented. Where, the computer program includes computer program codes which may be in the form of source code, object code, executable documents or some intermediate form, etc. The computer readable medium may at least include: any physical equipment or device that can carry the computer program codes, recording medium, computer memory, ROM (Read-Only Memory), RAM (Random Access Memory).

The embodiments described above are only intended to explain but not to limit the technical solutions of the present application. Although the present application has been explained in detail with reference to these embodiments, a person of ordinary skilled in the art can understand that, the technical solutions disclosed in the embodiments can also be amended, some technical features in the technical solutions can also be equivalently replaced; the amendments or the equivalent replacements don't cause the essence of the corresponding technical solutions to be deviated from the spirit and the scope of the technical solutions in the embodiments of the present application, and therefore should all be included in the protection scope of the present application.

What is claimed is:

1. A display terminal adjustment method implemented on the display terminal, comprising:
    obtaining image data of an image to be displayed and screen data of the display terminal, wherein the image data comprises an image size, and the screen data comprises a screen size;
    obtaining a first adjustment ratio and a second adjustment ratio according to the image size and the screen size, wherein the first adjustment ratio is an adjustment ratio corresponding to the display terminal in a first display mode, and the second adjustment ratio is an adjustment ratio corresponding to the display terminal in a second display mode;
    adjusting the image to be displayed to obtain a first target image according to the first adjustment ratio, and adjusting the image to be displayed to obtain a second target image according to the second adjustment ratio; and
    adjusting the display terminal to be displayed in a target display mode according to the first target image and the second target image, wherein the target display mode is the first display mode or the second display mode;
    wherein the image size comprises an original image height and an original image width, and the screen size comprises an original screen height and an original screen width;
    said obtaining the first adjustment ratio and the second adjustment ratio according to the image size and the screen size comprises:
    determining a first candidate ratio according to the original screen height and the original image height, and determining a second candidate ratio according to the original screen width and the original image width;
    determining the first candidate ratio as the first adjustment ratio if the first candidate ratio is less than or equal to the second candidate ratio; or determining the second candidate ratio as the first adjustment ratio if the first candidate ratio is greater than the second candidate ratio; and
    determining a third candidate ratio according to the original screen width and the original image height, and determining a fourth candidate ratio according to the original screen height and the original image width;
    determining the third candidate ratio as the second adjustment ratio if the third candidate ratio is less than or equal to the fourth candidate ratio; or determining the fourth candidate ratio as the second adjustment ratio if the third candidate ratio is greater than the fourth candidate ratio;
    wherein said adjusting the display terminal to be displayed in the target display mode according to the first target image and the second target image comprises:
    obtaining a first image area corresponding to the first target image and a second image area corresponding to the second target image;
    determining whether the second image area is greater than the first image area; and
    adjusting the display terminal to be in the second display mode if the second image area is determined as being greater than the first image area; or
    adjusting the display terminal to be in the first display mode if the second image area is determined as being smaller than or equal to the first image area.

2. The display terminal adjustment method according to claim 1, wherein said obtaining the image data of the image to be displayed and the screen data of the display terminal comprises:
    obtaining a display interface of the display terminal, and determining the image data of the image to be displayed and the screen data corresponding to the display terminal according to the display interface.

3. The display terminal adjustment method according to claim 2, wherein said determining the image data of the image to be displayed and the screen data of the display terminal according to the display interface comprises:
    determining the screen data of the display terminal according to interface data of the display interface;
    obtaining a blank area in the display interface, and determining area data of the blank area; and
    determining the image data of the image to be displayed according to the screen data and the area data.

4. The display terminal adjustment method according to claim 3, wherein said obtaining the blank area in the display interface comprises:
    obtaining Alpha, Red, Green, Blue (ARGB) values of a plurality of pixels in an image of the display interface; and
    determining target pixels which have an ARGB value being equal to a preset value from the plurality of pixels in the image of the display interface, and determining an area composed of the target pixels as the blank area.

5. The display terminal adjustment method according to claim 1, wherein after said adjusting the display terminal as the target display mode according to the first target image and the second target image, the method further comprises:
    obtaining an original angle and an original direction corresponding to the image to be displayed and a target angle and a target direction corresponding to the target display mode;
    determining a target adjustment angle of the image to be displayed according to the original angle and the target angle, and determining a target adjustment direction of the image to be displayed according to the original direction and the target direction;
    determining a target adjustment ratio of the image to be displayed according to the target display mode, wherein the target adjustment ratio is the first adjustment ratio or the second adjustment ratio; and adjusting the image to be displayed according to the target adjustment ratio, the target adjustment angle and the target adjustment direction, and displaying the image to be displayed adjusted according to the target adjustment ratio, the target adjustment angle and the target adjustment direction on the display terminal.

6. A display terminal, comprising a memory, a processor and a computer program stored in the memory and executable by the processor, wherein when the computer program is executed by the processor, the processor is caused to:

obtain image data of an image to be displayed and screen data of the display terminal, wherein the image data comprises an image size, and the screen data comprises a screen size;

obtain a first adjustment ratio and a second adjustment ratio according to the image size and the screen size, wherein the first adjustment ratio is an adjustment ratio corresponding to the display terminal in a first display mode, and the second adjustment ratio is an adjustment ratio corresponding to the display terminal in a second display mode;

adjust the image to be displayed according to the first adjustment ratio to obtain a first target image, and adjust the image to be displayed to obtain a second target image according to the second adjustment ratio; and adjust the display terminal to be in a target display mode according to the first target image and the second target image, wherein the target display mode is the first display mode or the second display mode;

wherein the image size comprises an original image height and an original image width, and the screen size comprises an original screen height and an original screen width;

when the computer program is executed by the processor, the processor is further caused to:

determine a first candidate ratio according to the original screen height and the original image height, and determine a second candidate ratio according to the original screen width and the original image width;

determine the first candidate ratio as the first adjustment ratio if the first candidate ratio is less than or equal to the second candidate ratio; or determine the second candidate ratio as the first adjustment ratio if the first candidate ratio is greater than the second candidate ratio;

determine a third candidate ratio according to the original screen width and the original image height, and determine a fourth candidate ratio according to the original screen height and the original image width; and determine the third candidate ratio as the second adjustment ratio if the third candidate ratio is less than or equal to the fourth candidate ratio; or determine the fourth candidate ratio as the second adjustment ratio if the third candidate ratio is greater than the fourth candidate ratio;

wherein when the computer program is executed by the processor, the processor is further caused to:

obtain a first image area corresponding to the first target image and a second image area corresponding to the second target image;

determine whether the second image area is greater than the first image area; and adjust the display terminal to be in the second display mode if the second image area is determined as being greater than the first image area; or adjust the display terminal to be in the first display mode if the second image area is determined as being smaller than or equal to the first image area.

7. The display terminal according to claim 6, wherein when the computer program is executed by the processor, the processor is further caused to:

obtain a display interface of the display terminal, and determine the image data of the image to be displayed and the screen data of the display terminal according to the display interface.

8. The display terminal according to claim 7, wherein when the computer program is executed by the processor, the processor is further caused to:

determine the screen data of the display terminal according to interface data of the display interface;

obtain a blank area in the display interface, and determining area data of the blank area; and determine the image data of the image to be displayed according to the screen data and the area data.

9. The display terminal according to claim 8, wherein when the computer program is executed by the processor, the processor is further caused to:

obtain Alpha, Red, Green, Blue (ARGB) values of a plurality of pixels in an image of the display interface; and determine target pixels which have an ARGB value being equal to a preset value from the plurality of pixels in the image of the display interface, and determine an area composed of the target pixels as the blank area.

10. The display terminal according to claim 6, wherein when the computer program is executed by the processor, the processor is further caused to:

obtain an original angle and an original direction corresponding to the image to be displayed and a target angle and a target direction corresponding to the target display mode;

determine a target adjustment angle of the image to be displayed according to the original angle and the target angle, and determine a target adjustment direction of the image to be displayed according to the original direction and the target direction;

determine a target adjustment ratio of the image to be displayed according to the target display mode, wherein the target adjustment ratio is the first adjustment ratio or the second adjustment ratio; and adjust the image to be displayed according to the target adjustment ratio, the target adjustment angle and the target adjustment direction, and display the image to be displayed adjusted according to the target adjustment ratio, the target adjustment angle and the target adjustment direction on the display terminal.

11. A non-transitory computer readable storage medium which stores a computer program, that, when executed by a processor, causes the processor to implement a display terminal adjustment method, comprising:

obtaining image data of an image to be displayed and screen data of the display terminal, wherein the image data comprises an image size, and the screen data comprises a screen size;

obtaining a first adjustment ratio and a second adjustment ratio according to the image size and the screen size, wherein the first adjustment ratio is an adjustment ratio corresponding to the display terminal in a first display mode, and the second adjustment ratio is an adjustment ratio corresponding to the display terminal in a second display mode;

adjusting the image to be displayed to obtain a first target image according to the first adjustment ratio, and adjusting the image to be displayed to obtain a second target image according to the second adjustment ratio; and adjusting the display terminal to be displayed in a target display mode according to the first target image and the second target image, wherein the target display mode is the first display mode or the second display mode;

wherein the image size comprises an original image height and an original image width, and the screen size comprises an original screen height and an original screen width;

said obtaining the first adjustment ratio and the second adjustment ratio according to the image size and the screen size comprises:

determining a first candidate ratio according to the original screen height and the original image height, and determining a second candidate ratio according to the original screen width and the original image width;

determining the first candidate ratio as the first adjustment ratio if the first candidate ratio is less than or equal to the second candidate ratio; or determining the second candidate ratio as the first adjustment ratio if the first candidate ratio is greater than the second candidate ratio; and determining a third candidate ratio according to the original screen width and the original image height, and determining a fourth candidate ratio according to the original screen height and the original image width;

determining the third candidate ratio as the second adjustment ratio if the third candidate ratio is less than or equal to the fourth candidate ratio; or determining the fourth candidate ratio as the second adjustment ratio if the third candidate ratio is greater than the fourth candidate ratio;

wherein said adjusting the display terminal to be displayed in the target display mode according to the first target image and the second target image comprises:

obtaining a first image area corresponding to the first target image and a second image area corresponding to the second target image;

determining whether the second image area is greater than the first image area; and adjusting the display terminal to be in the second display mode if the second image area is determined as being greater than the first image area; or adjusting the display terminal to be in the first display mode if the second image area is determined as being smaller than or equal to the first image area.

* * * * *